Figure 1:
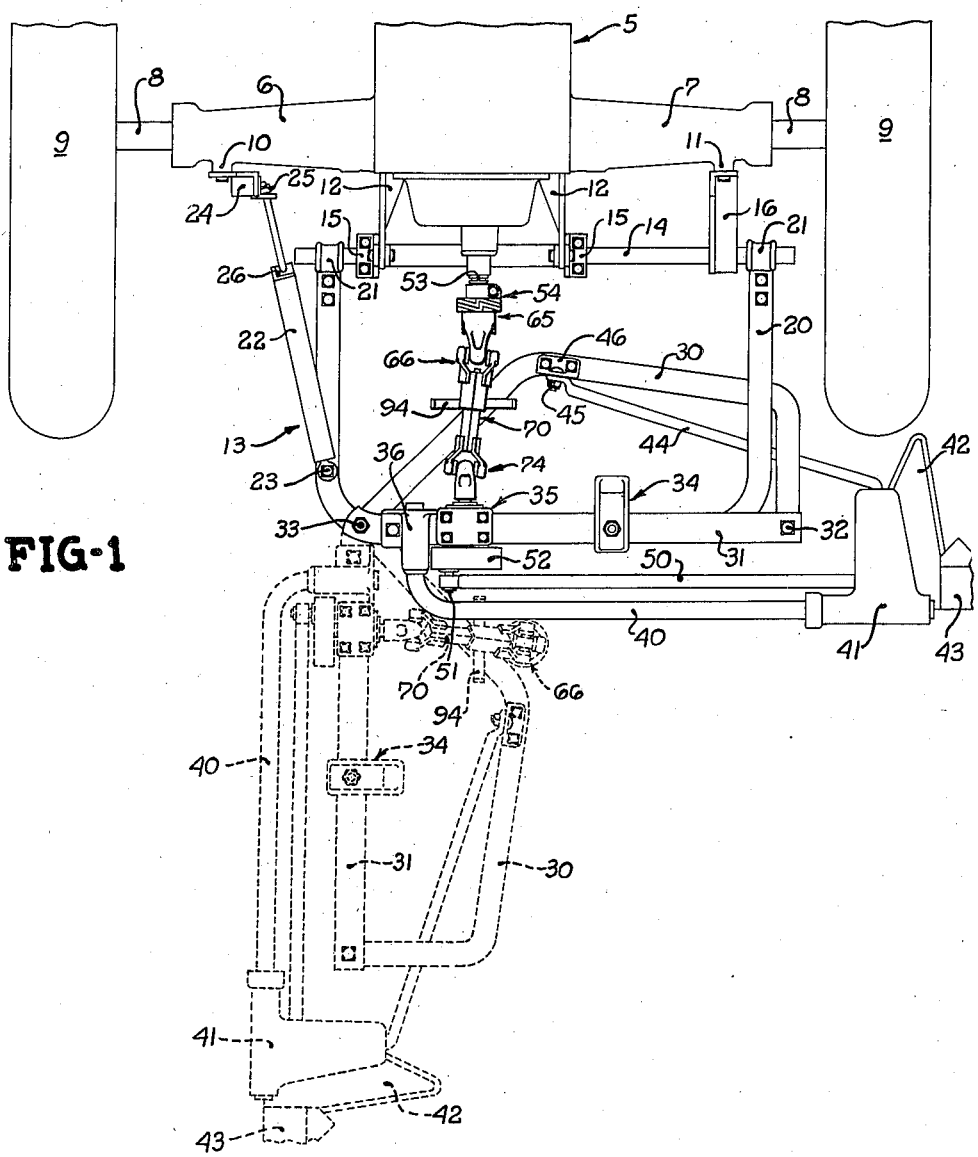

July 8, 1941.　　　C. BUDELIER ET AL　　　2,248,332
POWER TRANSMITTING DEVICE
Filed May 22, 1939　　　2 Sheets-Sheet 2

INVENTORS
CARL BUDELIER
WILBUR J. COULTAS
BY
ATTORNEYS.

Patented July 8, 1941

2,248,332

UNITED STATES PATENT OFFICE 2,248,332

POWER TRANSMITTING DEVICE

Carl Budelier, Rock Island, and Wilbur J. Coultas, Moline, Ill., assignors to Deere & Company, Moline, Ill., a corporation of Illinois Application May 22, 1939, Serial No. 274,924

8 Claims. (Cl. 56—25)

The present invention relates to power transmitting devices, and more particularly to a releasable coupling for transmitting rotary power from the power take-off shaft of a tractor to operating mechanism on an implement drawn thereby.

Certain types of implements, such as mowers for example, are connected to the tractor by a spring release hitch or latch that allows the cutter bar or other operating parts to swing back out of the way of serious obstructions and thereby prevent such parts from being damaged. It is desirable that the operation of the cutter bar should be stopped immediately upon its release, and to this end it is the usual practice to provide a releasable coupling device in the power train between the power take-off shaft and the driven shaft on the implement, generally immediately behind the power take-off shaft. Such coupling devices usually consist of a jaw clutch, the driving member of which is fixed to the power take-off shaft and the driven member thereof being carried by the driven shaft of the implement. When the cutter bar is released and swings rearwardly, the driven clutch member is pulled away from and out of engagement with the driving member to interrupt the transmission of power and stop the mechanism, said driven member usually dropping upon a support member provided on the implement for that purpose. The implement is coupled together again by backing the tractor up, which causes the cutter bar to swing back to its normal laterally extending position and the spring release hitch to reengage therewith. At the same time, the clutch driven member is manually guided into engagement with the driving member on the power take-off shaft to reestablish the power connection. One objection to this arrangement, however, resides in the fact that it is necessary to guide the driven clutch member into engagement with the driving member at the same time that the tractor is being operated, and due to the relative placement of the tractor controls and the power take-off shaft, such simultaneous operation is frequently difficult and hazardous when performed by one man.

The principal object of the present invention, therefore, is to provide a releasable coupling device of the character described which can be readily connected with the power take-off shaft after the spring release hitch has been recoupled, thereby eliminating the necessity of performing both operations simultaneously. We accomplish this object by mounting the clutch driven member on a telescoping shaft and providing suitable spring means for urging the clutch driven member into engagement with the driving member. The driven shaft of the implement is recoupled with the power take-off shaft of the tractor by telescoping the driven shaft against the compression of the spring sufficiently to align the clutch driven member with the driving member, and then allowing the spring to force the driven member into engagement with the driving member.

Figure 2:
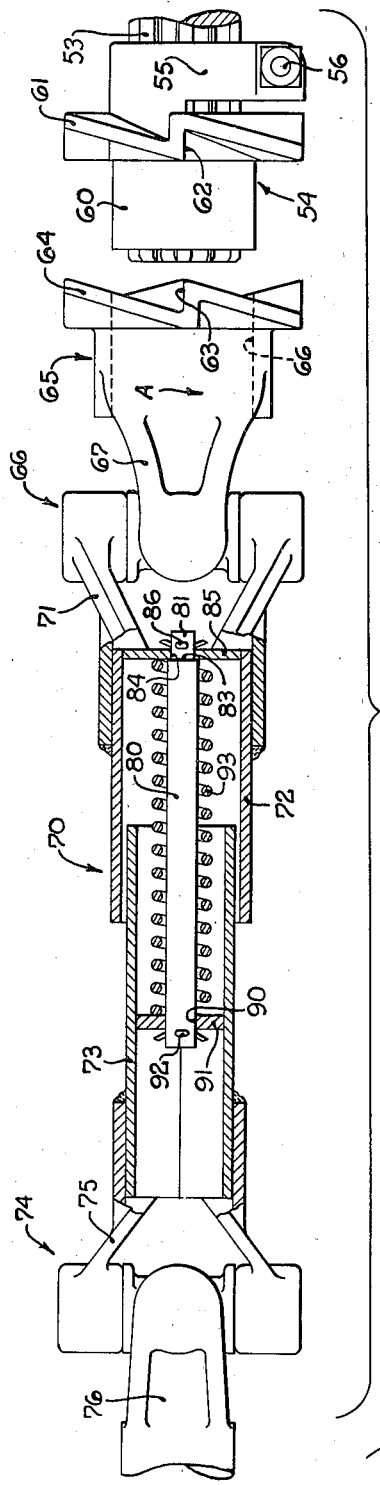

Other objects and advantageous features of our invention will become apparent to those skilled in the art after consideration of the following detailed description of the preferred form thereof, reference being had to the appended drawings, in which Figure 1 is a fragmentary plan view of a tractor mounted mower embodying our improved releasable coupling device in the power transmission system thereof; and Figure 2 is an enlarged, partially sectioned view of the coupling device, showing the clutch members separated.

Referring now to the drawings, we have illustrated our improved power transmitting device embodied in a mower mounted on a tractor 5 of the type comprising a body having laterally extending rear axle housings 6, 7, axles 8 journaled therein, and drive wheels 9 mounted on the outer ends of the axles 8. Rearwardly facing mounting bosses 10, 11 are provided on the back sides of the rear axle housings 6, 7, respectively, and serve as means for attaching the mower. A generally U-shaped draw frame 12 has the forward ends of its arms connected to the tractor body in any usual manner.

The draft frame of the mower is indicated in its entirety by the reference numeral 13 and consists of a transverse pipe or tubular member 14 secured by brackets 15 to the draw frame 12 and by a vertical standard 16 to the mounting boss 11 on the rear axle housing 7. A U-shaped main supporting frame 20 of the mower is pivotally connected to the pipe 14 for vertical swinging movement, by means of clamp members 21, fixed to the front ends of the arms thereof. This main frame extends rearwardly from the tractor and is further supported by means of a tension link 22, which is bolted at 23 to the left arm of the frame 20 and slidably engages the upper end of a vertical standard 24 fixed to the mounting boss 10 on the axle housing 6. A nut 25 is threaded on the forward end of the link 22 and engages the front face of the standard 24 to limit the downward swinging movement of the U-shaped frame member 20 and thereby hold the mower in proper operating position with respect to the tractor. A shoulder 26 on the link 22 is engageable with the back face of the standard 24 to limit the upward swinging movement of the frame member 20 to a predetermined angular extent.

The mower is carried by an auxiliary frame or sub-frame which is suitably mounted upon the main supporting frame 20. This sub-frame comprises a forward member 30 of substantially U-shape in plan, and a rearward member 31. The left-hand end of member 30 is disposed under frame 20 adjacent the rear left corner thereof and the right-hand end of the member 30 is bolted at 32 to the right end of member 31. The left-hand end of the rearward member 31 is disposed on top of the main supporting frame 20 and is secured thereto by a pivot bolt 33 which is passed through aligned holes in members 30 and 31 and the frame 20. This serves to secure the members of the sub-frame together and also to provide a pivotal connection between the sub-frame and the main supporting frame 20, the sub-frame being swingable about the bolt 33 relative to frame 20 so as to be moved into and out of operating relation thereto.

The sub-frame, which carries the mower cutter bar and operating mechanism, is normally locked to the main supporting frame 20 with the member 31 disposed above the bight portion of this frame 20 and in substantial parallelism therewith, the cutter bar 43 extending laterally outwardly beyond the right hand side of the tractor. In order that the cutter bar may swing rearwardly to clear an obstruction which offers considerable resistance thereto, such as a stump or rock, the mower is provided with means for releasably locking the sub-frame to the main frame in operative relation thereto, said means taking the form of a spring release latch, indicated in its entirety by the reference numeral 34. Since the latch 34 forms no part of the present invention, it is not deemed necessary to show and describe the same in detail herein, although reference may be had to letters Patent No. 1,915,548, granted to T. W. Paul on June 27, 1933, for details of construction and operation of such a latch. Suffice to say, the latch 34 is mounted on the sub-frame member 31 and has suitable cooperating members adapted to engage the bight portion of the main supporting frame 20 for holding the sub-frame of the mower in operating position against normal operating resistance. In the event that the cutter bar 43 encounters an object which offers unusual resistance thereto such as would be apt to cause injury to the mower, the resulting rearward pressure causes the latch 34 to disengage the frame 20, thus releasing the sub-frame which is then free to swing rearwardly into the extreme dotted line position of Figure 1 so as to clear the obstruction. After the obstruction has been cleared, the mower can readily be restored to operating position by backing the tractor up, which causes the sub-frame to swing about the pivot 33 to its normally laterally extending position and the latch 34 to automatically reengage the frame 20.

Mounted on the sub-frame member 31 adjacent the left end thereof, is a transmission housing 35 of usual construction and preferably embodying an integral bearing sleeve 36. An L-shaped drag bar 40 is pivotally mounted at its inner end in the bearing sleeve 36 and is suitably connected at its outer end to the shoe head 41 of the cutting mechanism. This cutting mechanism is, in general, of known type and comprises the head 41, shoe 42, cutter bar 43 and associated parts. The cutting mechanism need not be illustrated or described in detail, it being sufficient to note that such a mechanism of more or less conventional type is provided. The shoe head 41 is also connected by a tension rod 44 to the front portion of the sub-frame member 30, said tension rod being pivotally connected by a bolt 45 to a bracket 46 fixedly mounted on the member 30. The drag bar 40 and tension rod 44 thus allow the shoe head 41 and associated parts to rise and fall in a manner well known in the art.

The cutter bar 43 is reciprocated in the usual manner by means of a pitman 50 suitably connected thereto at one end, the other end of this pitman rod being eccentrically connected at 51 to a flywheel 52 which is driven, from a drive shaft, through a suitable transmission of known type mounted in the housing 35. The mower drive shaft is driven, through the medium of a transmission shaft and universal joints, from a rearwardly extending, splined power take-off shaft 53 of the tractor 5, there being a releasable clutch of special construction disposed in serial arrangement between the tractor power take-off shaft and the mower drive shaft, which acts to disconnect the power from the mower when it is swung rearwardly out of operative position.

Referring now more particularly to Figure 2, the driving member of the releasable clutch is in the form of a sleeve 54 which fits over the end of the power take-off shaft 53 and is fixedly secured thereto by a split-clamp portion 55 that is tightened by a nut and bolt 56. The rearward portion 60 of the sleeve 54 has a cylindrical outer periphery and functions as a supporting hub or pilot, while intermediate of the ends of the sleeve is a flange 61 having a plurality of rearwardly facing, unidirectional teeth 62. These teeth cooperate with similar teeth 63 provided on a flange 64 at the front end of a collar 65 forming the driven member of the clutch. The collar 65 has a cylindrical aperture 66 which is adapted to receive the pilot 60 in a loose telescoping fit allowing for sliding as well as rotating movement of the member 65 relative to the member 54. The clutch teeth 63 are directed oppositely to teeth 62, the teeth of the two clutch elements being so related that the member 65 is driven in the direction of the arrow A from the power take-off shaft 53, this being the normal direction of rotation of shaft 53.

The driven clutch member 65 also includes an integral forked portion 67 comprising one element of a universal joint 66 provided at the front end of the transmission shaft 70, the other element 71 of the joint being fixedly secured, as by welding, to the end of the shaft 70. The transmission shaft 70 consists of a large tubular member 72 and a smaller tubular member 73, both of square cross section, with the larger tube telescoping over the smaller one and longitudinally slidable relative thereto. A second universal joint 74 is disposed at the rear end of the transmission shaft 70 and comprises one member 75 which is welded or otherwise suitably secured to the end of the smaller tube 73, and a second member 76 which is fixed to the mower drive shaft.

Disposed within the square tubular members 72, 73 is a longitudinally extending rod 80, the front end of which is cut back, as at 81, to form a shoulder 83. The reduced end portion 81 of the rod extends through an aperture 84 in an end wall 85 which is fixed to the tube 72, and is secured by a cotter pin 86 which bears against the front face of the wall 85 to prevent relative rearward movement of the rod 80. The shoulder 83 bears against the back face of the wall 85 to prevent relative forward movement of the rod 80.

The rear end of the rod 80 extends through an aperture 90 in a partition wall 91 which is disposed within and fixed to the smaller tubular member 73. The rod 80 is freely slidable within the aperture 90 and is prevented from slipping out of the aperture by a cotter pin 92 which is passed through the end of the rod and is adapted to bear against the back face of the partition wall 91 in the manner of a limit stop. A compression spring 93 encircles the rod 80, bearing at one end against the partition wall 91 and at the other end against the end wall 85. Thus, the telescoping transmission shaft 70 has its two tubular members 72, 73 urged apart into fully extended position by the spring 93, the extended length of the shaft being more or less determined by the distance between walls 85, 91 and the relative length of the rod 80. Since the engaging teeth 62, 63 of the clutch are perpendicular to the force acting thereon during operation, a great force is not required to be exerted by the spring 93 to hold the members together. The spring is therefore made light enough to be easily compressed by hand.

The operation of our device is as follows: When the mower is initially mounted on the tractor, the draft frame 13 is first connected with the tractor body by means of the brackets 15 and vertical standards 16, 24. The sleeve 54 is then slipped onto the tractor power take-off shaft 53 and secured thereto by the clamp 55. Next, the transmission shaft 70 is telescoped against the pressure of the spring 93, and the clutch member 65 is guided onto the pilot member 60, after which the spring is allowed to force the clutch teeth 63 into operating engagement with the teeth 62 so that the transmission shaft 70 is driven from the power take-off shaft 53 of the tractor.

In the event that the cutter bar encounters an obstruction which offers sufficient resistance to release the sub-frame from the main frame, the sub-frame swings rearwardly so that the cutter bar clears the obstruction, as previously described. This rearward swinging movement of the sub-frame about the pivot 33 withdraws the transmission shaft 70, and with it the clutching member 65, from the power take-off shaft 53, thereby disengaging the clutching members 54, 65 and interrupting the drive to the cutter bar. When the member 65 is withdrawn clear of the pilot 60, the transmission shaft 70, being no longer supported at its front end, drops down upon a support member 94 provided on the sub-frame member 30 for the purpose. As soon as the obstruction has been cleared, the operator swings the cutter bar back into its operative position, after which the driving connection between shafts 53 and 70 is reestablished by manually telescoping the shaft 70 sufficiently to bring the collar 65 into register with the pilot hub 60, and then releasing the shaft to allow the spring 93 to force the driven clutch member into operating engagement with the driving clutch member.

What we claim is:

1. In combination, a main frame, an auxiliary frame movable toward and away from said main frame, releasable means normally connecting said frames, rotary mechanism mounted on each of said frames, and power transmitting means interconnecting said mechanisms including shaft means, releasable means for coupling one end of said shaft means to, and supporting the same on one of said mechanisms, comprising a pair of relatively rotatable telescoping members, each having a clutch element fixed thereto, said elements being interengageable only when said telescoping members are substantially closed together, and flexible means connecting the other end of said shaft means with the other of said mechanisms, said telescoping members being separated axially when said auxiliary frame moves away from said main frame, thereby first disengaging said clutch elements and then dropping said shaft means and said telescoping members away from alinement with each other, said power transmitting means being extensible and having means biasing the same toward extended position, whereby said power transmitting means can be manually shortened to bring said telescoping members into alinement after said auxiliary frame is returned to normally connected position relative to said main frame.

2. In combination, a driving shaft, a driven shaft movable into and out of operative position with respect to said driving shaft, and transmission means for releasably coupling said shafts together, whereby said driven shaft is automatically disconnected from the driving shaft when moved out of said operative position, said transmission means comprising a transmission shaft, flexible means connecting one end of said transmission shaft with said driven shaft, a pair of separable relatively rotatable telescoping members, one of said members being connected with said driving shaft and the other being connected with the other end of said transmission shaft, said telescoping members serving to support said transmission shaft when interengaged and allowing the transmission shaft to drop away from the driving shaft when separated, a pair of clutch elements fixed to said telescoping members, respectively, and interengageable only when the latter are telescoped together, and resilient means tending to extend said transmission, means to hold said clutch elements together, said resilient means being yieldable to permit manually shortening said transmission means to allow said other telescoping member to be aligned with and engage said first named telescoping member when said driven shaft is in operative position, and thereafter urging the clutching elements into driving connection.

3. In combination, a driving shaft, a driven shaft movable into and out of operative position with respect to said driving shaft, and transmission means for releasably coupling said shafts together, whereby said driven shaft is automatically disconnected from the driving shaft when moved out of said operative position, said transmission means comprising a telescoping transmission shaft, flexible means connecting one end of said transmission shaft with said driven shaft, a driving clutch member fixedly mounted on said driving shaft, a driven clutch member connected with the other end of said transmission shaft and adapted for axial movement relative to said driving clutch member into and out of engagement therewith, a pair of separable relatively rotatable telescoping members associated with said clutch members, respectively, and disposed coaxially thereof, said telescoping members cooperating to support said transmission shaft when engaged, and releasing the same when disengaged whereby said driven clutch member drops away from alignment with said driving clutch member, and resilient means tending to extend said transmission shaft, said resilient means being yieldable to permit manually telescoping the shaft to allow said telescoping member on said driven clutch member to be moved into axial alignment with the corresponding member on said driving clutch member when said driven shaft is in operative position and thereafter urging the driven clutch member into engagement with the driving clutch member.

4. In combination, a driving shaft, a driven shaft movable into and out of operative position with respect to said driving shaft, and transmission means for releasably coupling said shafts together, whereby said driven shaft is automatically disconnected from the driving shaft when moved out of said operative position, said transmission means comprising a telescoping transmission shaft, flexible means connecting one end of said transmission shaft with said driven shaft, a driving clutch member fixedly mounted on said driving shaft, a driven clutch member adapted for axial movement relative to said driving clutch member into and out of engagement therewith, flexible means connecting said driven clutch member with the other end of said transmission shaft, means on said driving clutch member adapted to slidably and rotatably receive said driven clutch member for supporting the same in axially aligned engagement with the driving clutch member, but permitting relative rotation therebetween until said clutch members move axially into engagement with each other, said driven clutch member dropping away from axial alignment with the driving clutch member when disengaged therefrom, and resilient means tending to extend said transmission shaft, said resilient means being yieldable to permit manually telescoping the shaft to allow said driven clutch member to be brought into register with said supporting means, and thereafter urging the driven clutch member into engagement with the driving clutch member.

5. In combination, a driving shaft, a driven shaft movable axially into and out of operative position with respect to said driving shaft, and transmission means for releasably coupling said shafts together whereby said driven shaft is automatically disconnected from the driving shaft when moved out of said operative position, said transmission means comprising a pair of shaft members connected together for axial sliding movement relative one another and adapted to transmit rotary power, one of said shaft members being operatively connected with said driven shaft, a driving clutch member fixedly mounted on said driving shaft, a driven clutch member operatively connected with the other of said shaft members and adapted for axial movement relative to said driving clutch member into and out of driving engagement therewith, means associated with said driving clutch member engageable with said driven clutch member for rotataly supporting the same in axial alignment with said driving clutch member but out of clutching engagement therewith, said support means being adapted to release said driven clutch member when said driven shaft is moved out of said operative position and allow the same to drop out of axial alignment with said driving clutch member, and spring means connected with said shaft members for extending the same, said spring means being yieldable to permit manually sliding the shaft members together whereby said driven clutch member can be aligned with said driving clutch member and supported on said supporting means when said driven shaft is in operative position, and said spring means thereafter urging the driven clutch member into driving engagement with the driving clutch member.

6. In combination, a driving shaft, a driven shaft movable axially into and out of operative position with respect to said driving shaft, and transmission means for releasably coupling said shafts together whereby said driven shaft is automatically disconnected from the driving shaft when moved out of said operative position, said transmission means comprising a pair of square tubular shaft members disposed in telescoping relation, a universal joint connecting one of said shaft members with said driven shaft, a driving clutch member fixedly mounted on said driving shaft, a driven clutch member movable axially relative to said driving clutch member into and out of driving engagement therewith, a second universal joint connecting said driven clutch member with the other of said shaft members, said clutch members having cooperating portions adapted to support said tubular shaft members when engaged, providing for relative rotation therebetween until said clutch members move axially into engagement with each other, and releasing the same when disengaged whereby said driven clutch member drops away from alignment with said driving clutch member, a compression spring disposed within said tubular shaft members and bearing at each end against one of said shaft members tending to extend the same, said spring being yieldable to permit manually telescoping said shaft members whereby said driven clutch member can be positioned in alignment with said driving clutch member with said cooperating portions in engagement, when said driven shaft is in operative position, said spring thereafter urging the driven clutch member into engagement with the driving clutch member.

7. For use with a tractor having a power take-off shaft, an implement comprising a main supporting frame adapted to be mounted on the tractor body, an auxiliary frame connected with said main frame for swinging movement relative thereto between operative and inoperative positions, a latch device for releasably holding said auxiliary frame in operative position, operating mechanism carried on said auxiliary frame and swingable therewith, and transmission means for releasably coupling said power take-off shaft with said operating mechanism whereby the latter is automatically disconnected from the power take-off shaft when said auxiliary frame swings to inoperative position, said transmission means comprising a telescoping transmission shaft, means connecting one end of said transmission shaft with said operating mechanism, a driving clutch member fixed to said power take-off shaft, a driven clutch member connected with the other end of said transmission shaft and adapted for axial movement relative to said driving clutch member into and out of engagement therewith, a pair of separable relatively rotatable telescoping members associated with said clutch members, respectively, and disposed coaxially thereof, said telescoping members serving to support said transmission shaft when engaged and allowing the transmission shaft to drop away from the power take-off shaft when disengaged, and spring means for urging said telescoping transmission shaft into extended position and normally maintaining said driven clutch member in engagement with the driving clutch member, said spring means being yieldable to permit manually telescoping the shaft and bringing said telescoping member on the driven clutch member into register with the corresponding member on said driving clutch member when said auxiliary frame is in operative position.

8. For use with a tractor having a rearwardly extending power take-off shaft, a mowing implement comprising a main supporting frame adapted to be fixedly mounted on the rear end of the tractor body, a cutter bar supporting frame connected with said main frame for swinging movement relative thereto between a laterally extending operative position and a rearwardly trailing inoperative position, a forwardly extending drive shaft journaled on said cutter bar supporting frame for driving cutting mechanism thereon, and transmission means for releasably coupling said power take-off shaft with said drive shaft whereby the latter is automatically disconnected from the power take-off shaft when said cutter bar frame swings to inoperative position, said transmission means comprising a telescoping transmission shaft, flexible means connecting one end of said transmission shaft with said drive shaft, a driving clutch member fixed to said power take-off shaft, a driven clutch member adapted for axial sliding movement relative to said driving clutch member into and out of operative engagement therewith, flexible means connecting said driven clutch member with the other end of said transmission shaft, a pair of separable relatively rotatable telescoping members associated with said clutch members, respectively, and disposed coaxially thereof, said telescoping members serving to support said transmission shaft when engaged, permitting relative rotation before said clutch members are brought into engagement, and allowing the transmission shaft to drop away from the power take-off shaft when disengaged, and spring means tending to extend said telescoping transmission shaft, said spring means being yieldable to permit manually telescoping the shaft and bringing said telescoping member on the driven clutch member into register with the corresponding member on said driving clutch member when said cutter bar frame is in operative position.

CARL BUDELIER.
WILBUR J. COULTAS.